June 5, 1945.　　　　A. SLOVAK　　　　2,377,383
FEED CONTROL FOR AUTOMATIC SCREW MACHINES
Filed Jan. 19, 1942　　　6 Sheets-Sheet 1

INVENTOR
Andrew Slovak
By Parker, Carlson, Pitzner & Hubbard
ATTORNEYS

June 5, 1945. A. SLOVAK 2,377,383
FEED CONTROL FOR AUTOMATIC SCREW MACHINES
Filed Jan. 19, 1942 6 Sheets-Sheet 2

INVENTOR
Andrew Slovak
By Parker, Carlson, Pitzner & Hubbard
ATTORNEYS

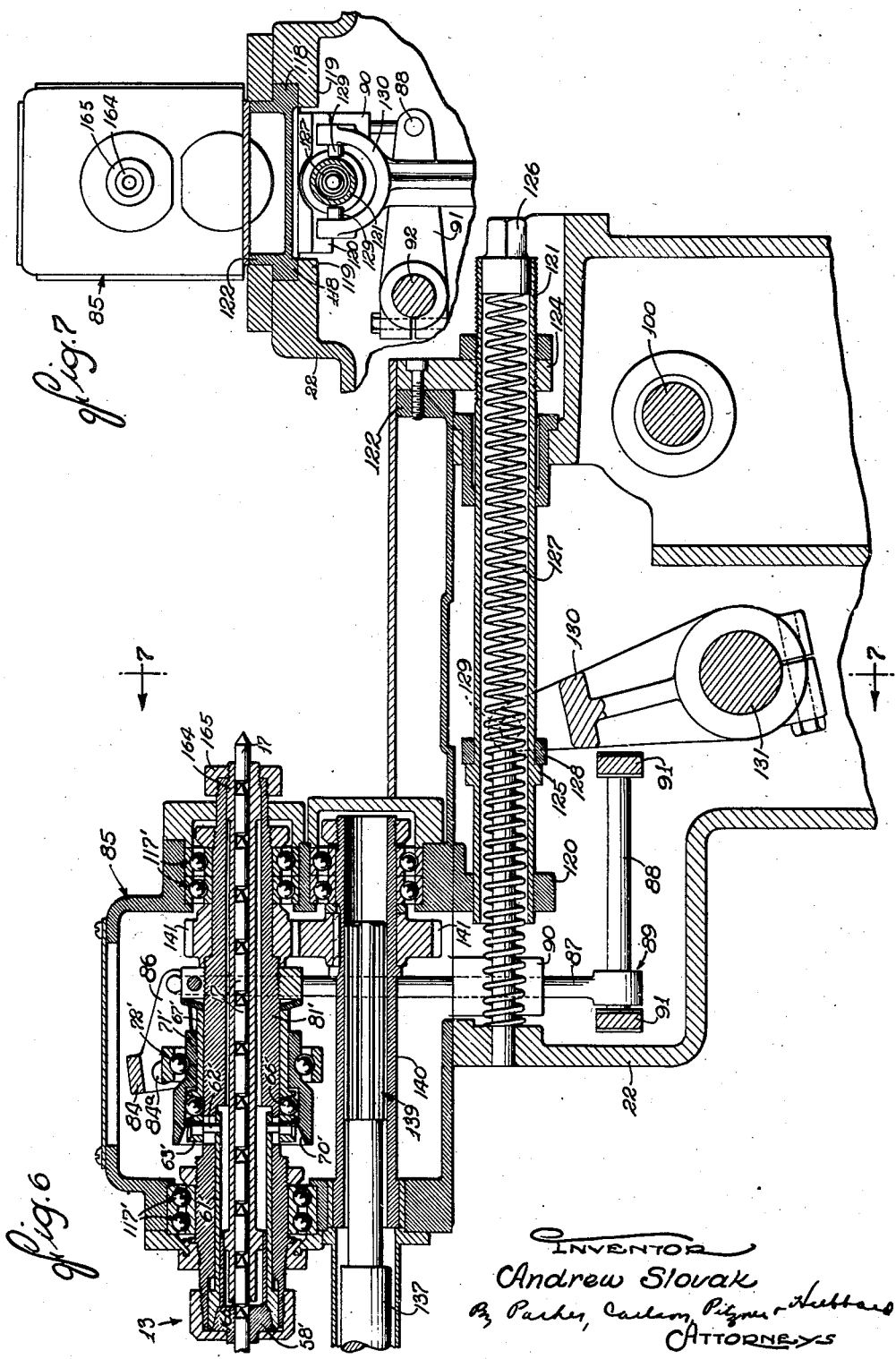

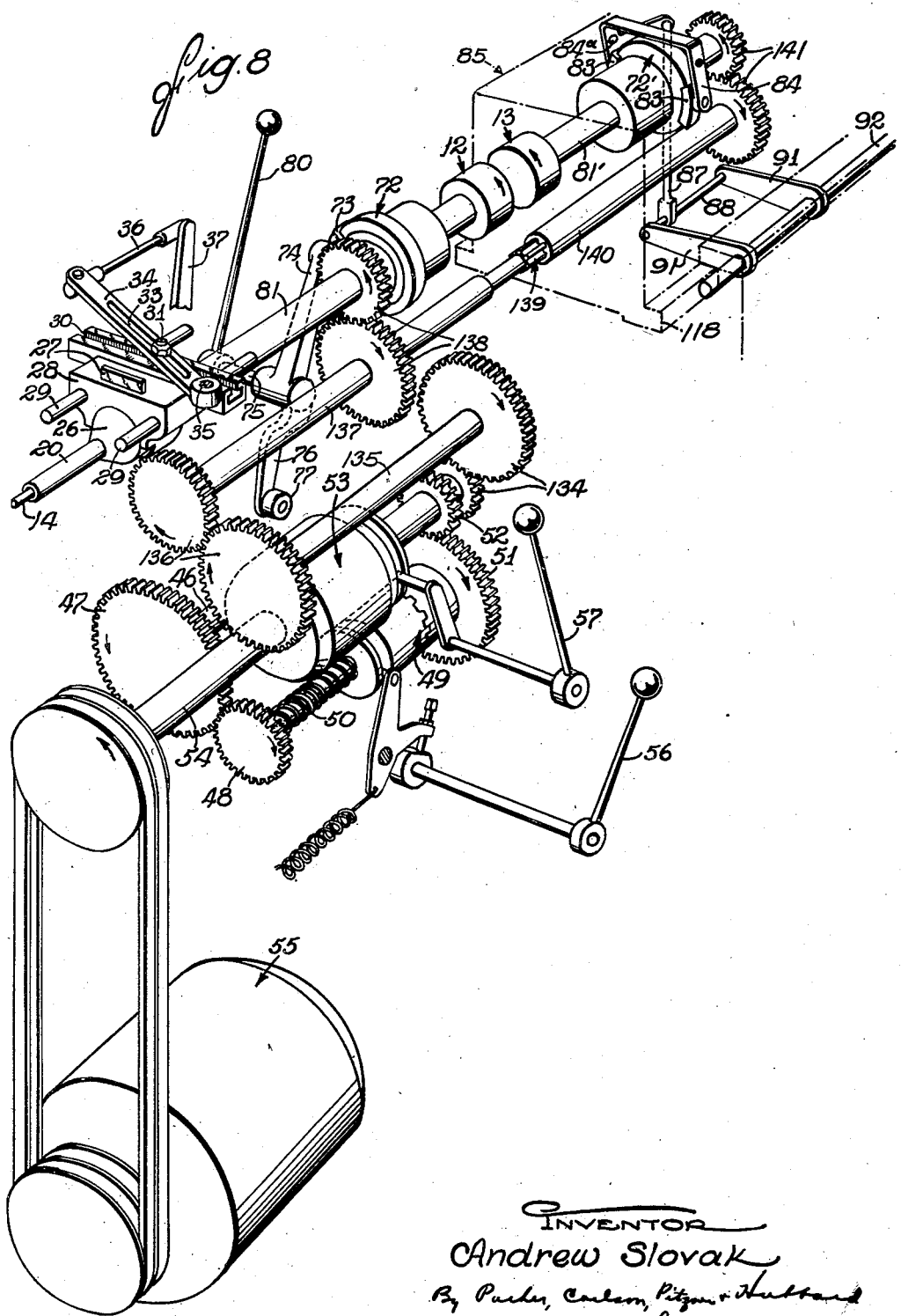

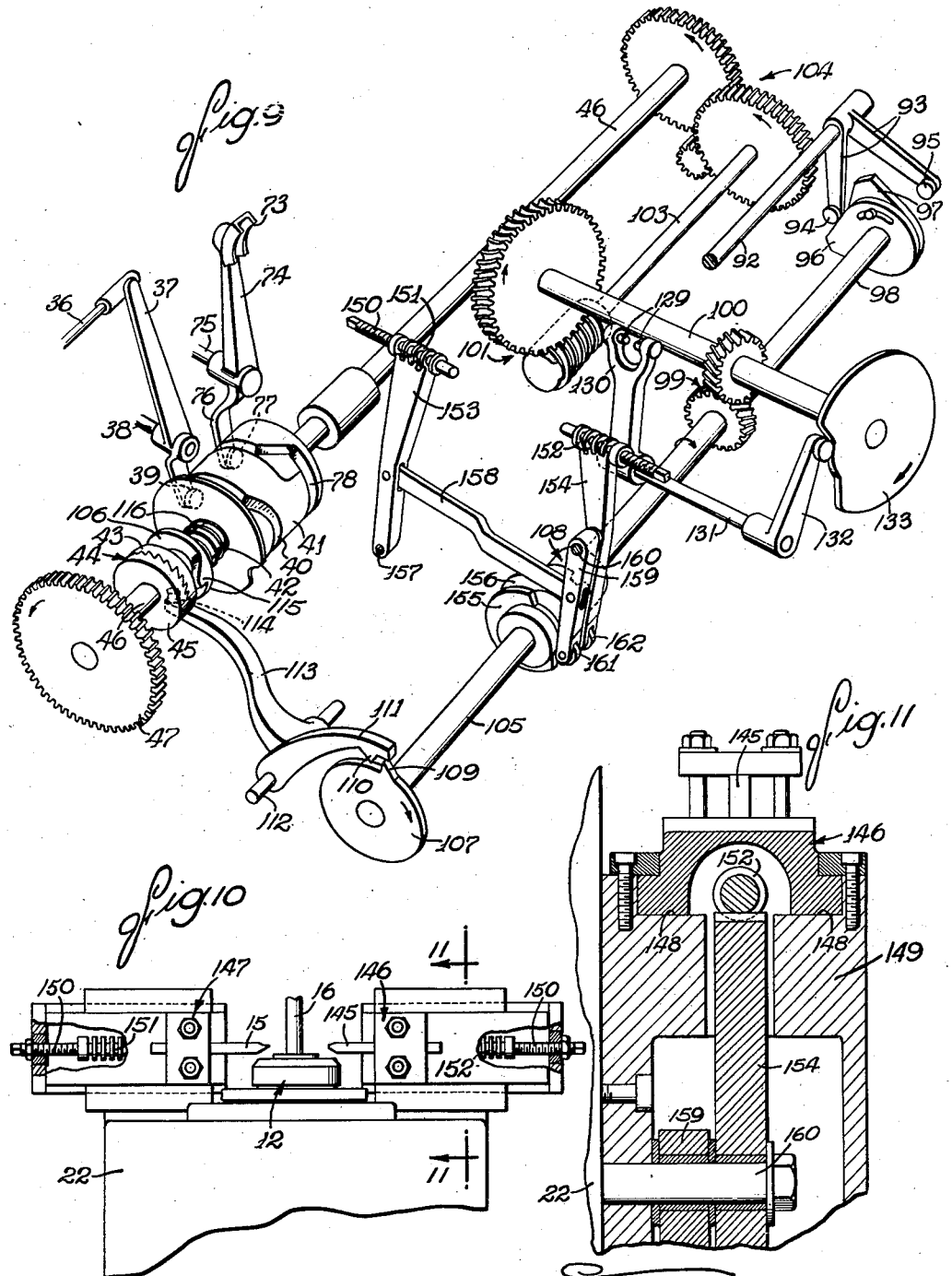

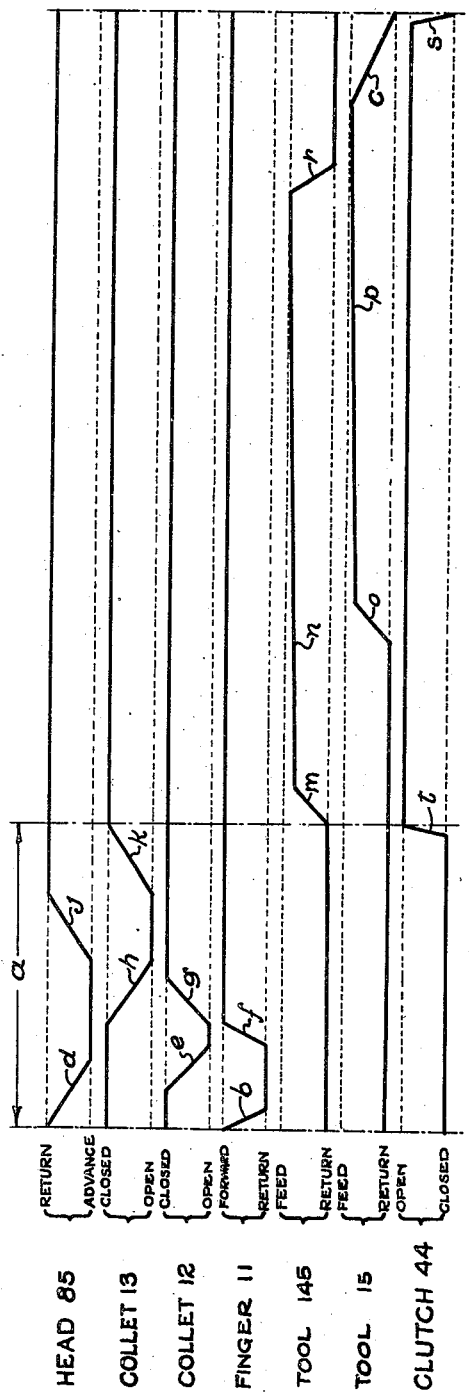

Patented June 5, 1945

2,377,383

UNITED STATES PATENT OFFICE 2,377,383

FEED CONTROL FOR AUTOMATIC SCREW MACHINES

Andrew Slovak, Rockford, Ill.

Application January 19, 1942, Serial No. 427,230

17 Claims. (Cl. 164—38)

This invention relates to automatic screw machines and the general object is to provide an improved control for determining the advance of the stock to eliminate burrs on the cut-off piece.

Another object is to provide a novel method of and mechanism for supporting the remote end of a stock bar in an automatic screw machine during cutting off of the latter and for ejecting the cut off piece.

A more detailed object is to utilize the cut-off work piece as a stop for limiting the advance of the stock to position the same for formation of the next piece.

The invention also resides in the novel mechanism employed for controlling the movements of the stock stop in timed relation to the machine cycle.

Other objects and advantages of the invention will become apparent from the following detailed description taken in connection with the accompanying drawings, in which Figures 1 to 4 are fragmentary views illustrating various steps in the improved method.

Fig. 6 is a similar view of the movable head on the opposite end of the machine.

Fig. 7 is a section taken along the line 7—7 of Fig. 6.

Fig. 8 is a perspective view showing the collet drive mechanisms.

Fig. 9 is a perspective view of the actuators for the collets, the movable collet head and the tools.

Fig. 10 is a fragmentary plan view of the cutting tools and their mountings.

Fig. 11 is a section taken along the line 11—11 of Fig. 10.

Fig. 12 is a time chart.

Figure 1:
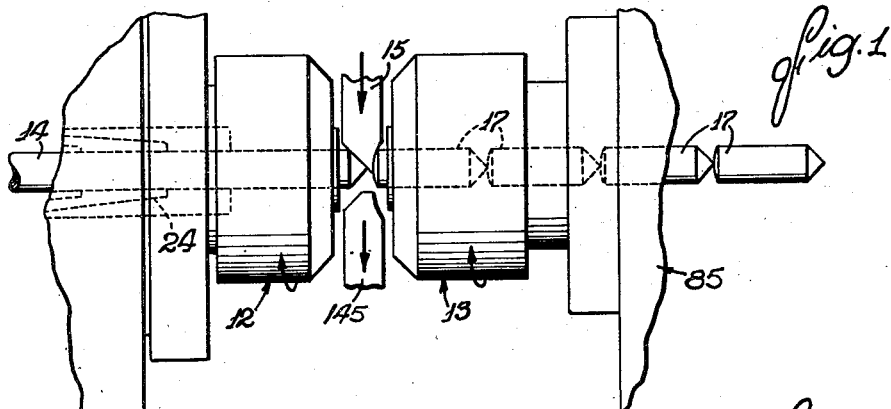

While the invention is susceptible of various modifications and may be practiced in various ways, I have illustrated in the drawings and will describe here in detail the preferred embodiment and method. It is to be understood, however, that I do not intend to limit the invention by such specific disclosure but aim to cover all modifications and alternative constructions and methods falling within the spirit and scope of the invention as expressed in the appended claims.

Figure 2:
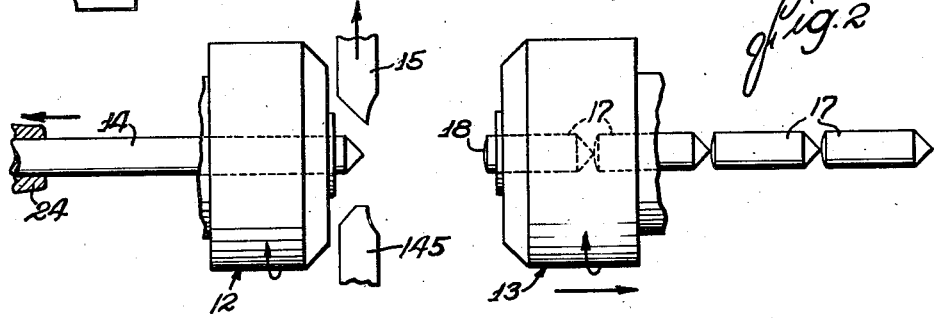
Figure 3:
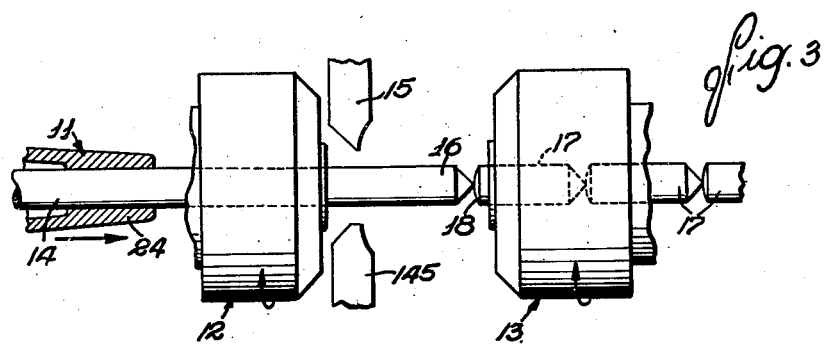
Figure 4:
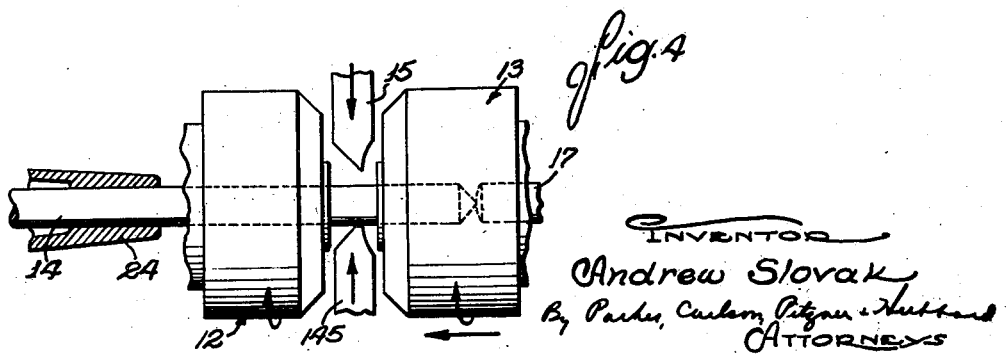

As illustrated in Figs. 1 to 4, the method of controlling the stock advance in accordance with the present invention involves the use of the usual feed finger 11, hollow rotary collets or clamps 12 and 13 for gripping the rotating stock 14 on opposite sides of a tool 15 which is fed transversely of the work to cut off the advanced end portion 16. The method comprises generally applying the clamps 12 and 13 to grip the stock on opposite sides of the tool 15, advancing and retracting the tool as illustrated in Figs. 1 and 2 to cut off the leading end portion 16, and form a finished work piece 17, axially advancing the clamp 13 to a position shown in Fig. 2 determined by the length of the work piece, releasing the clamp 12 and advancing the feed finger 11 to advance the leading end of the stock until it comes against the trailing end 18 of the preceding work piece 17 while the latter is held by the clamp 13, releasing the latter clamp and retracting the same to a position opposite the advanced stock ahead of the tool, and finally applying this clamp. By thus holding the stock end, the work piece is cut off cleanly and no burrs are formed. At the same time, the finished work pieces are kept clean and separated from the chips.

Figure 5:
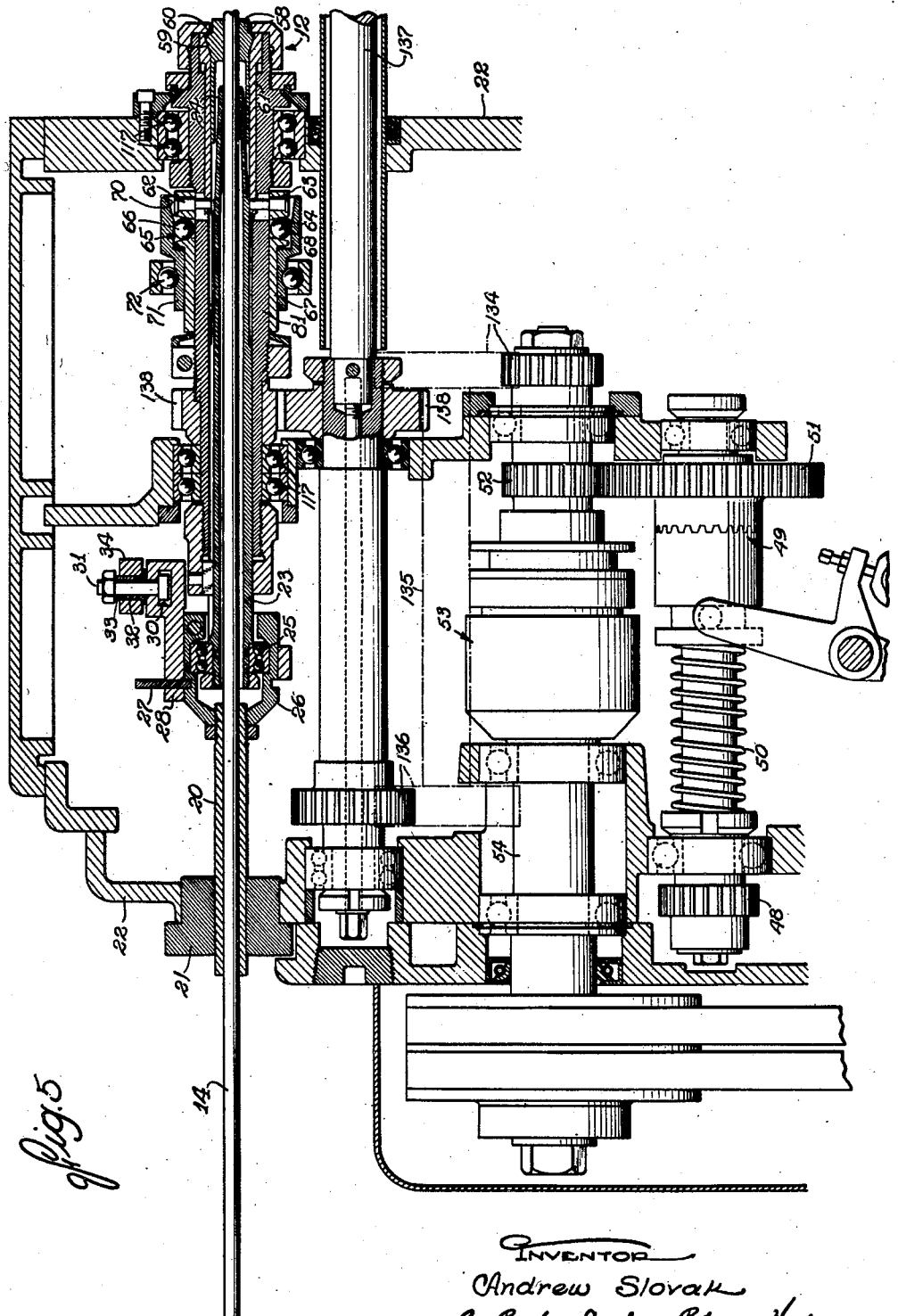
Fig. 5 is a vertical sectional view of the headstock on one end of the machine.

Referring now to Figs. 5 to 7, the stock 14 extends through the usual guide sleeve 20 supported in a block 21 at the outer end of the headstock frame 22. Beyond this sleeve the stock projects through a sleeve 23 which constitutes the shank of the feed finger whose spring jaws 24 grip the stock immediately behind the collet 12. At its end, the feed sleeve 23 is journaled in a bearing 25, the outer race of which is supported in a head 26 threaded onto the sleeve 20 and connected by a key 27 to a block 28 slidable parallel to the stock on stationary bars 29 (Fig. 8). The block has a T-slot 30 along which a bolt 31 is adjustable. This bolt supports a bushing 32 projecting through a slot 33 and pivotally connected to a lever 34 fulcrumed on a fixed pivot 35. The free end of the lever is connected by a link 36 to a lever 37 pivoted at 38 (Fig. 9) and having a follower roller 39 riding in a slot 40 of a barrel cam 41. This cam is fixed on a sleeve 42 rigid with the driven member 43 of a one-revolution clutch 44 having its driving member 45 on a shaft 46 carrying a gear 47 which meshes with the gear 48 and is driven through the medium of a jaw clutch 49 normally engaged by a spring 50. A gear 51 fast on the clutch driver is driven through a gear 52 through the medium of a friction clutch 53 on a shaft 54 belt driven from the main drive motor 55. The clutches 49 and 53 may be engaged and disengaged by manipulation of handles 56 and 57.

Each time the one-revolution clutch 44 is released in the manner to be described later, the cam 41 makes one revolution and the lever 34 is actuated to retract the block 28 and therefore the feed finger and then after a short dwell advances the finger through a distance determined by the adjusted position of the bolt 31 along the slot 30. Usually this distance will be slightly greater than the overall length of the work piece.

The collet 12 is of ordinary construction comprising spring jaws 58 disposed within a sleeve 61 and adapted to be squeezed together to grip the bar by axial shifting of the sleeve during which a tapered surface 60 thereon acts on an inclined surface 59. The sleeve 61 is slidable in a power driven sleeve 81 which is supported by bearing 117 in the main frame. It is connected through a pin 62 to a ring 63 inclined on one side as shown at 64 and cooperating with a similarly inclined end 68 on a sleeve 67 to form a groove 65 in which balls 66 are located. The sleeve 67 is enclosed by a sleeve 71 which carries a ball bearing 72 and is shifted to the right as viewed in Fig. 5 by a yoke 73 (Figs. 8 and 9) acting on the outer bearing race. In this movement, a surface 70 cams the balls inwardly, separating the parts 63 and 67 and the resulting axial movement of the sleeve 61 closes the collet, as shown in Fig. 5, to grip the bar. In the reverse movement of the yoke, that is, to the left, the surface 70 permits the balls to expand and the spring stress in the jaws opens the latter. The yoke 73 is carried by an arm 74 pivoted on a rockshaft 75 in the main machine frame 22 and arranged to be actuated by a hand lever 80 or by cam actuation of an arm 76. The latter carries a follower 77 which engages a groove 78 in the barrel cam 41. The cam surfaces of the grooves 40 and 78 are correlated to permit the feed finger 11 to be retracted while the collet is closed followed by opening of the collet while the feed finger is being advanced and finally to again close the collet.

The parts of the machine thus far described are typical of those commonly used in automatic screw machines for advancing a stock bar step-by-step and cutting off the end portion of the stock beyond the main collet 12. As pointed out above, the present invention contemplates the use of the auxiliary collet 13 rotated in synchronism with the main collet and operating to grip and support the advanced end of the stock while it is being cut off and then to advance the cut-off piece axially to a position determined by the length of the work piece next to be formed so that the trailing end of the cut-off work piece may serve as a positive stop to limit the next advance of the stock bar by the feed finger.

As shown, the collet 13 is of the same general construction as the main collet 12 and like parts are indicated by corresponding primed numbers. Since this collet is to be shifted axially, the bearings 117' of the main spindle sleeve 81' are supported in a member 85 which is mounted to slide on the main frame of the machine parallel to the work and collet axes. Herein this member comprises a casting (Figs. 6 and 7) having bottom flanges 118 which slide in ways 119 formed on the main frame and spaced from the end of the headstock.

To open and close the collet, the outer race of the bearing 72' is engaged by a yoke 83 (Figs. 6 and 8) on a U-shaped member 84 pivoted at 84ª on the head 85. An arm 86 on the member 84 is connected by a link 87 having a slidable connection 88 with a rod 89 which is supported by arms 91 fast on a rockshaft 92 on the main frame. The lower end of the link 87 projects through a depending boss 90 on the bottom of the head 85. The opposite end of the rockshaft carries a second pair of arms 93 (Fig. 9) having rollers 94 and 95 that follow cams 96 and 97 which are fast on a shaft 98 and circumferentially adjustable relative to one another to provide a dwell between the opening and the closing of the collet 13. As the camshaft turns clockwise from the position shown in Fig. 9, the cam 96 opens the collet 13 and after a dwell, the cam 97 rocks the shaft 92 reversely to close the collet.

In order that the opening and closing of the collets 12 and 13 and the actuation of the feed finger 11 may be synchronized, the cam shaft 98 is driven from the feed camshaft 46. This drive includes a pair of spiral gears 99, a transverse shaft 100, worm gearing 101, a shaft 103, and pickoff gears 104. The camshaft 98 also times the operation of the one-revolution clutch 44. For this purpose, a cam 107 mounted on the shaft 105 is coupled to the shaft 98 by one tooth jaw clutch 108. A lobe 109 on the cam is arranged to engage a projection 110 on a follower arm 111 pivoted on a stationary pin 112 and rigid with an arm 113 which will be depressed each time the lobe 109 passes the projection 110. Such movement of the arm 113 retracts a pin 114 which allows the clutch 44 to engage under the action of a spring 116. The pin 114 rides in a cam groove 106 and after nearly one revolution, one cam surface 115 engages the pin whereupon the driven clutch member 43 is shifted axially to disengage the clutch jaws as the revolution is completed.

To shift the head along the ways 119 to move the collet 13 axially back and forth, a cored-out extension 122 projects from the outer end of the head (see Fig. 6) and rigid at its end with a nut 124 threaded onto the end of a tube 121 which is supported at its other end in a lug 120 depending from the head. Within the tube is a compression spring 127 which acts between a plug 126 and a wall of the main frame 22 and thus tends to shift the head to the right, as viewed in Fig. 6. This movement is limited by engagement of a flange 125 on the tube with collar 128 which bears against pins 129 of a yoke 130 fast on a rockshaft 131. At its other end, this shaft carries a follower arm 132 (Fig. 9) bearing against the periphery of a cam 133 which is fast on the shaft 100 and therefore rotates counterclockwise. The cam is contoured to advance the head against the action of the spring after the collet 13 has been opened, the extent of this motion being determined by the adjustment of the tube 121 relative to the nut 124.

It will be observed that each work piece is pushed on through the collet 13 in the retraction of the latter to the left as viewed in Fig. 6. The piece is thus delivered to the coned end 166 of a tubular magazine 164 sized according to the diameter of the work pieces and supported at one end by the sleeve 61 and at the other end by the spindle 81 to which the magazine is connected by a nut 165 threading onto the outer ends of the magazine and the spindle.

The two collet spindles 81 and 81' are driven in unison and continuously. For this purpose, pickoff gears 134 (Fig. 8) connect the shaft 54 to the shaft 135 connected in turn through gears 136 to a shaft 137 which drives the spindle 81 through gears 138. The shaft 137 is extended beneath the tool 15 and within the head 85 has a spline connection 139 with a tubular shaft 140 journaled in the head and connected to the spindle 81' through gears 141 having the same ratio as the gears 138. The connection 139 permits the head to shift axially while the spindle 81 continues to rotate.

In the present instance, the tool 15 effects the final cutting off of the advanced end of the stock to form the work piece and the major portion of the metal is removed by a form tool 145 which is shaped to form the desired contours on the trailing end 18 of the work piece and on the leading end 16 of the stock. These tools are clamped in the desired positions on holders 146 and 147 slidable on ways 148 provided by a bracket 149 fastened to the end of the headstock housing 22 beneath the collet 12. The tool holders are thus adapted to slide transversely of the stock and perform their cutting functions by entering the stock from opposite sides. The outer ends of the tool holders 146 and 147 are adjustably connected by screws 150 to circular racks 151 and 152 meshing with gear teeth on the upper ends of arms 153 and 154 which are actuated respectively by cams 155 and 156 fast on the shaft 105. The arm 153 is pivoted at 157 on the headstock housing and connected by a link 158 to a lever 159 fulcrumed on a fixed pivot 160 and carrying a roller 161 engaging the cam 155. The arm 154 is also fulcrumed at 160 and a roller 162 on its lower end bears against the periphery of the cam 156. The cams are shaped to rapid approach, feed, and rapid return the tools 15 and 145 in the sequence shown on the time chart.

Operation

The cams 133, 78, 96, 97, 40, 156 and 155 are shaped to time the advance and retraction of the head 85, the opening and closing of the collets 12 and 13, the advance and retraction of the feed finger 11, the form tool 145 and the cut-off tool 15 in the sequence shown in the time charts which show one complete cycle of operation. In tracing this cycle, it will be noted that the tools 15 and 145 and the head 85 are actuated by cams which rotate continuously whereas the opening and closing of the collets 12 and 13 and the advance and retraction of the feed finger 11 are controlled by cams which are driven through the medium of the clutch 44 so that the cams make one revolution during the portion a of the cycle. At the time when the clutch 44 becomes engaged by withdrawal of the pin 114, the parts will be conditioned as shown in Fig. 1, the cut-off tool 15 having just completed its operation. At this time, the collet 12 will be closed on the stock bar and the collet 13 will be gripping the last cut-off work piece, both collets rotating in synchronism. In the first part of the cycle, the feed finger 11 and the cut-off tool 15 are retracted as indicated at b and c. At the same time, the cam 133 advances the head 85 as indicated at d carrying the last cut-off work piece forwardly a distance equal to the length of this work piece. The parts will then be positioned as shown in Fig. 2, both collets remaining closed. In the latter part of the head motion the cam 78 operates to initiate opening of the collet 12 as indicated at e thereby releasing the stock bar so that the latter may be advanced by the feed finger as indicated at f. Because the last cut-off work piece is clamped by the collet 13 and the latter is held positively by the cam 133 in its advanced position, the trailing end 18 of the work piece constitutes a stop for limiting the advance of the stock bar by the feed finger as indicated at f. Thus, in the advance of the finger the leading end 16 of the stock engages the trailing end 18 of the preceding work piece, the frictional character of the gripping engagement between the stock and the feed finger permitting the latter to overtravel slightly and thereby insure that the stock will be advanced fully to the position shown in Fig. 3. Next the headstock collet 12 is closed to grip the advanced stock bar as indicated at g and substantially simultaneously the collet 13 is opened as indicated at h. Then the cam 133 operates to return the head 85 as indicated at j during which the advanced end 16 of the stock constitutes a stop for pushing the line of work pieces through the magazine 164. In the final portion of the revolution of the clutch 44, the collet 13 is closed by the cam 97 as indicated at k thereby gripping the advanced end of the bar which is thus held in readiness for advance of the tools. The form tool 145 first advances as indicated at m to shape the trailing end of the work piece next to be formed as well as the leading end of the succeeding work piece. Actual cutting engagement with the work takes place as indicated at n during which the clutch 44 becomes disengaged as indicated at t, and the cut-off tool is rapidly advanced at o and then fed into the work at p. Before the cut-off is complete the form tool is retracted as indicated at r, the parts thus being returned to the position shown in Fig. 1 in readiness for starting the next cycle by engagement of the clutch 44 as indicated at s.

I claim as my invention:

1. The method of controlling the stock advance in an automatic screw machine having a cut-off tool and stock clamps on opposite sides of the tool, said method comprising applying said clamps to the advanced stock to grip the latter on opposite sides of said tool, advancing and retracting said tool to cut off the end portion thereof, advancing the clamp holding the cut-off end through a distance predetermined by the next length of stock to be cut off, releasing the other clamp, advancing the stock to bring the leading end against the trailing end of the previously cut-off piece, releasing said first clamp and retracting it to a position adjacent said tool, and applying both of said clamps to grip the advanced stock.

2. The method of controlling the stock advance in an automatic screw machine having spaced stock clamps, said method including the steps of closing said clamps to grip the advanced stock, cutting off the stock between said clamps, advancing the clamp holding the cut-off end through a distance predetermined by the next length of stock to be cut off, releasing the other clamp, and advancing the stock to bring the leading end against the trailing end of the previously cut-off piece.

3. The method of controlling the advance of a bar of stock which comprises gripping the bar at spaced points along its length, cutting off the bar between said points, maintaining the gripping force on the cut-off end, advancing the gripping means through a distance predetermined by the next length of bar to be cut off, and advancing the bar until the leading end comes against the trailing end of the previously cut-off piece.

4. The method of controlling the advance of a bar of stock which comprises gripping the bar at spaced points along its length, cutting off the bar between said points, maintaining the gripping force on the cut-off end, advancing the gripping means to a position predetermined by the next length of bar to be cut off, releasing the other gripping force, and yieldably advancing the bar until the leading end comes against the trailing end of the previously cut-off piece while the latter is held in said position.

5. In a screw machine, the combination of a pair of independently operable power actuated clamps for gripping a stock bar at spaced points along its length, means supporting one of said clamps for axial movement, a tool for cutting off the bar between said points, mechanism operable to advance and retract said tool while said clamps are applied to the advanced end of the bar, mechanism operable to advance said movable clamp and the cut-off end away from the other clamp a distance predetermined by the next length of bar to be cut off, and means for advancing the bar until the leading end comes against the trailing end of the previously cut-off piece while the latter is held in advanced position by the movable clamp.

6. In a machine of the character described, the combination of a rotary clamp for gripping a stock bar, a feed finger frictionally gripping said bar and movable to advance the bar and project the end portion thereof beyond said clamp, a second rotary clamp engageable with said end portion, a head supporting said clamp for movement axially of the bar through a distance corresponding to the length of the pieces to be formed, a tool for cutting off the bar between said clamps, means for rotating said clamps in unison, and mechanism for controlling the closing and release of said second clamp to hold the cut-off piece in advanced position whereby the trailing end of the piece constitutes a stop for limiting the feed of the bar by said finger.

7. In a machine of the character described, the combination of mechanism for advancing a stock bar step by step and cutting off the advanced end sucsessively, a collet power driven in synchronism with the rotation of said bar and adapted to grip the advanced end of the bar, a member supporting said collet for gripping engagement with said advanced end and for axial movement to carry the cut-off piece away from the stock bar, spring means urging said member in a direction reverse to the stock advance, and a cam operable to positively move said member reversely to locate the cut-off piece in a position to act as a stop for limiting the next advance of the stock bar.

8. In a machine of the character described, the combination of a tool for cutting off a stock bar, a pair of independently operable clamps for gripping said bar on opposite sides of the tool, means for rotating said clamps in unison, means supporting for axial movement the clamp which grips the cut-off end portion of the bar, mechanism for advancing and retracting said tool, opening and closing said clamps, and advancing and retracting said supporting means, means for limiting the advance of said supporting means to a position corresponding to the length of the next piece of bar to be cut off, and means for feeding the bar forwardly until the leading end thereof engages the trailing end of the cut-off piece while the latter is gripped by said movable clamp with the latter in its advanced position.

9. The combination with a feed finger for advancing a stock bar past a cut-off tool of a rotary collet supporting the end portion of the bar beyond said tool, a member rotatably supporting said collet for movement axially of said bar to carry the cut-off piece away from the bar to a position corresponding to the length of stock next to be cut off, and actuating means for shifting said member and controlling the opening and closing of said collet whereby the trailing end of the cut-off piece constitutes a stop for limiting the advance of the stock by said feed finger.

10. In a machine of the character described having a feed finger and a cut-off tool, a rotary collet supporting the end portion of the stock to be cut off beyond said tool, a member rotatably supporting said collet for movement axially of said stock, actuating means for shifting said member, and means controlling the opening and closing of said collet in timed relation to the actuation of said feed finger.

11. The combination of means rotatably supporting a stock bar including an axially movable feed finger, a tool movable transversely of the supported bar to cut off an end portion thereof, rotary collets for gripping the bar on opposite sides of said tool, a member supporting the remote collet for axial movement, two power driven shafts extending parallel to said collets and driving the latter continuously, a spline connection between said shafts permitting of movement of said member during rotation of the collets, and means controlling the opening and closing of said collets and the movement of said member.

12. In a machine for cutting off successive lengths of a stock bar, an auxiliary rotary collet arranged to grip the leading end of the bar while it is being cut off, means for advancing said rotary collet axially in opposite directions, and means operable while said collet is advanced away from the stock bar to provide a stop for limiting the next advance of the stock bar.

13. The combination with the power rotated main collet, feed finger and cut-off tool of an automatic screw machine of an auxiliary rotary collet for gripping the advanced end of the stock bar while the latter is being cut off, means supporting said auxiliary collet for movement of the cut-off piece to a position in which it acts as a stop for limiting the advance of the stock by said feed finger, and power operated means driving said auxiliary collet in synchronism with the rotation of said main collet.

14. In a machine of the character described, the combination of mechanism for advancing a stock bar step by step and cutting off the advanced end successively, and means operable to hold each cut-off piece in an advanced position in which its trailing end acts as a stop for limiting the next advance of the stock.

15. In a machine of the character described, the combination of mechanism for advancing a stock bar step by step and cutting off the advanced end successively, a rotary collet adapted to clamp and release the leading end of the stock bar and to rotate therewith, means supporting said collet for movement axially of the bar between a first position overlapping said leading end and a second position spaced from this end, mechanism operable to shift said collet to said second position after a piece of said bar has been cut off and to said first position after the next advance of the bar, and means operable while said collet is in said second position to provide a stop positively limiting the next advance of said stock bar.

16. In a machine of the character described, the combination of mechanism for advancing a stock bar step by step and cutting off the advanced end successively, a rotary collet adapted to clamp and release the leading end of the stock bar and to rotate therewith, means supporting said collet for movement axially of the bar between a first position overlapping said leading end and a second position spaced from this end, mechanism operable to shift said collet to said second position after a piece of said bar has been cut off and to said first position after the next advance of the bar, and means disposed within said collet while the latter is in said second position and operable to provide a stop positively limiting the next advance of said stock bar.

17. The method of cutting off successive lengths of a bar in a machine having axially spaced rotary collets one of which is fixed and the other of which is shiftable axially, said method comprising advancing the bar through said fixed collet, gripping a portion of the advanced bar by said fixed collet and the leading end of the bar by said shiftable collet, cutting off the bar between said collets, moving said shiftable collet away from the fixed collet, again advancing the bar through said fixed collet a distance corresponding to the length of the cut-off piece of stock, and retracting said shiftable collet toward said fixed collet for engagement with the leading end of said stock in the new position of the latter.

ANDREW SLOVAK.